United States Patent Office 3,400,181
Patented Sept. 3, 1968

3,400,181
METHOD OF PREPARING CARBONIZED SHAPED CELLULOSE CRYSTALLITE AGGREGATES
Orlando A. Battista, Yardley, and James A. Robertson, Levittown, Pa., assignors to FMC Corporation, Philadelphia, Pa., a corporation of Delaware
No Drawing. Filed Feb. 26, 1965, Ser. No. 435,712
11 Claims. (Cl. 264—29)

ABSTRACT OF THE DISCLOSURE

A method of making a shaped carbon article by mixing cellulose crystallite aggregates and a liquid; forming a shape from the mixture, then drying and heating the shape to a carbonization temperature.

---

Products formed in accordance with this invention are useful for a variety of purposes depending on their shape, size and chemical consistency. For example, carbon articles prepared with this invention are useful as filters for gases and liquids, as catalysts, for application in the nuclear reactor field and magnetics as well as many other fields.

It is a principal object of this invention to provide a method of preparing various shaped articles of pure carbon.

It is another object of this invention to provide a method of preparing shaped articles containing pure carbon and other materials or compounds intimately mixed therewith.

These and other objects will be realized in accordance with the persent invention, which is a method of preparing a shaped carbon article which comprises mixing cellulose crystallite aggregates and a non-solvent liquid therefor to form a paste, forming a shaped article from the paste, removing the liquid from the article, and heating said article to a carbonizing temperature under reducing conditions.

In another form of the invention the cellulose crystallite aggregates and non-solvent liquid are also mixed with other materials broadly including, for example, carbon, asbestos, inexpensive cellulose filler, glass forming oxides, metals and metal compounds. After shaping and drying, the article is fired in the absence of oxygen to produce a product of pure carbon and one or more other compounds or materials.

The articles to be manufactured in accordance with this invention may be produced in any desired shape including, for example, rods, tubes, spheres and blocks. If the article contains a large quantity of cellulose crystallite aggregates considerable shrinkage thereof will occur on carbonizing. This is taken into account when preparing the article and sufficient excess of the crystallite aggregates is incorporated to make up for the eventual reduction in size. On the other hand, the shrinkage phenomenon may be used advantageously for the preparation of exceedingly small articles such as minute spheres of carbon. The fact that the articles hold their shape and relative dimensions, and do not fall apart during carbonizing permits the manufacture of useful non-dusting carbon articles of all shapes and sizes.

The cellulose crystallite aggregates used for the method of this invention are acid-insoluble products produced by the controlled hydrolysis of cellulose. They have a level-off degree of polymerization (D.P.) as measured in accordance with the disclosure in a paper by O. A. Battista entitled, "Hydrolysis and Crystallization of Cellulose," vol. 42, Industrial and Engineering Chemistry, pp. 502-7 (1950).

A specific form of the cellulose crystallite aggregates is described in U.S. Patent No. 2,978,446, issued Apr. 4, 1961, to Battista and Smith. As described in this patent, a cellulose material is subjected to a controlled acid hydrolysis to dissolve amorphous forms of cellulose leaving as a residue cellulose crystallite aggregates. The cellulose is subjected to the hydrolysis treatment for a time and at a temperature sufficient to disrupt the continuity of the fine structure. One such method comprises treating the cellulose with a 2.5 normal hydrochloric acid solution for 15 minutes at the boiling temperature of the solution. Another suitable method involves treating the cellulose with a 0.14 normal (0.5%) hydrochloric acid solution at 121° C. under pressure for 1 hour. In accordance with the method as described in the patent, the insoluble residue is preferably washed free of acid.

The cellulose crystallite aggregates which are recovered from the hydrolysis treatment have a particle size in the range of less than 1 micron to about 375 microns, depending on the cellulose source, as determined visibly by microscopic examination and may be designated as "as-formed cellulose crystallite aggregates."

The source material for the cellulose crystallite aggregates may be any of the natural cellulose materials, such as natural fibers, for example, ramie, cotton, purified cotton, purified wood pulps such as bleached sulfite pulp, bleached sulfate pulp, etc., or regenerated forms of cellulose, for example, rayon, cellophane, etc., and in all instances has an actual D.P. greater than its average level-off D.P. The aggregates may have an average level-off D.P. value in the range of from about 15 to about 375 and the specific value will be dependent upon the source material. Aggregates having an average level-off D.P. in the range of 15 to 60, for example, are produced from regenerated forms of cellulose. Aggregates having an average level-off D.P. in the range of 60 to 125 may be obtained from alkali swollen natural forms of cellulose such as cotton linters and purified wood pulps. Sulfite pulp as a source material will produce cellulose crystallite aggregates having an average level-off D.P. in the range of 200 to 300. Although the cellulose chains in the crystallites are uniform in length by comparison with the source material, some variation occurs, and, for this reason, the D.P. is referred to as an average level-off D.P. value.

As obtained from the acid hydrolysis and water washing steps, the aggregates in the over-all average level-off D.P. range of 15 to 375 are in a loosely aggregated state and, particularly in the larger sizes, say from 40 to 250 or 375 microns, are characterized by the presence of many cracks in their surfaces, including similar surface irregularities or phenomena like pores, depressions, voids, fissures and notches. Because of such irregularities, the apparent or bulk density of the aggregates is much less than their absolute density.

If desired mechanical disintegration of the aggregates may be carried out in several ways, as by subjecting them to attrition in a mill, or to a high speed cutting action, or they may be forced through a multiplicity of fine holes so that they are subjected to an attriting or shearing action by entrance and passage through the openings as well as to the attriting action by virtue of being rubbed against each other under the influence of applied force. The disintegration of the aggregates is preferably carried out in the presence of an aqueous medium.

The preferred disintegration method is to attrite the aggregates by means of high speed cutting action in the presence of an aqueous medium. The aggregates may be in a dry or never-dried state prior to attrition, although water should be present during the cutting or shearing of the particles. If they are initially in the never-dried state, that is, as received from the water washing step, they have a moisture content of at least 40% by weight, and it is possible to attrite them without further addition of water. In any event, it is preferred that the water content of the mixture undergoing attrition should be at least 10 to 20% by weight. The aggregates content of the mixture should be at least 3% by weight, and preferably is higher as the efficiency of the cutting action increases with the aggregates' content.

The attrited or non-attrited crystallite aggregates are usually dried for storage and handling after preparation. The drying is suitably carried out by a number of drying procedures including, for example, spray drying, freeze drying, drum drying and drying by solvent displacement. Some of these drying procedures advantageously produce lower bulk density materials. Spray drying, for example, wherein the wet aggregates are sprayed into hot, dry air, produces a material having a considerably higher surface area as compared to the same weight of material dried by standing in air or in an oven. Furthermore, it has been observed that the combination of mechanical attrition, preferably in an aqueous medium, and spray drying of the cellulose crystallite aggregates produces a more porous material preferred for the manufacture of active carbon.

The other compounds or materials which are useful in combination with the cellulose crystallite aggregates are generally in finely-divided particulate form or may be soluble in the liquid wetting medium with which the cellulose aggregates are mixed or another liquid.

These other materials are used in amounts ranging from 5 to 95% based on the weight of the dry solids in the shaped article prior to carbonization. The preferred amounts used will depend on the nature of the other material and the end use to which the carbon article will be put.

Finely-divided cellulose fibers, asbestos fibers, mica, carbon, glass forming oxides, metals and metal compounds in general are broad examples of the blending components for this invention. Carbon particles are used for example in sizes from 1 to 300 microns and higher, and in amounts ranging to 95% based on the dry weight of the shaped article prior to carbonization. This is an excellent method for obtaining shaped pure carbon articles from inexpensive carbon dust or powder. The resulting articles are low-dusting or non-dusting articles having the desired shape and form.

Finely-divided asbestos fibers may be used, for example, in amounts of about 50% based on the weight of the carbonized article to produce a shaped article of pure carbon containing finely-divided asbestos.

High amounts of inexpensive, ground up cellulose fibers may also be used with the cellulose crystallite aggregate binder to produce shaped carbon articles.

Powdered metals and metallic compounds are mixed with the cellulose aggregates in amounts ranging from about 1% up to about 75% by weight depending on the intended use of the finished article.

Examples of metals used for this invention include sodium, potassium, copper, magnesium, calcium, barium, zinc, aluminum, titanium, tin, lead, manganese, iron and nickel. These metals may be used in finely-divided free form or as compounds which are reduced to the free metal on carbonizing.

Examples of metal compounds which are used include cupric acetate, magnesium carbonate, barium sulfate, calcium carbonate, zinc sulfate, titanium chloride, lead acetate, ferric nitrate, ferric oxide, various metallic phosphates and manganous oxide.

Glass-forming oxides include, for example, silicon dioxide, boron oxide, aluminum oxide and zirconium oxide.

The articles of this invention may be shaped in various ways. The cellulose crystallite aggregates or mixtures of this and other powdered materials in the form of a wet mass or paste is shaped in molds, by extrusion, by rolling, by balling or by any other expedient method. After drying to a solidified mass, it can be cut to the desired length or shape before carbonizing. A particularly preferred shape is a small sphere or ball which can be produced by mixing the ingredients including the wetting agent in mixing vessel having mixing paddles which conform substantially to the shape of the side of the vessel. The beaters or paddles are set for the desired size of the balls or spheres by spacing them a prescribed distance from the wall of the vessel. When the mixing is started the paste-like mixture is flattened out along the wall of the mixing vessel but eventually begins to form in the shape of small balls or spheres. Continued mixing converts virtually all of the mixture to uniform size spheres. After the spheres are formed they are dried to form a free-flowing mass.

Any type of apparatus capable of forming shaped articles from cellulose crystallite aggregates or homogeneous mixture of them and other particulate material may be employed for this invention.

While water is a preferred wetting agent for aiding the formation of the shaped articles of this invention, other liquid media, including mixtures of water with polar or non-polar liquids or combinations of the same, are useful. Examples of such non-aqueous liquids include alcohols, hydrocarbons, esters, ethers, acids, ketones, aldehydes, amines and sulfoxides.

The shaped article is dried after forming to remove the wetting agent. The drying is generally brought about by permitting the article to stand in air or under conditions which promote drying. Drying conditions which tend to produce steam should be avoided.

Any suitable carbonizing procedure may be used to produce the carbon article of this invention. Usually, the shaped articles are placed in a heating device such as an electric furnace and heated to carbonizing temperatures, e.g., 400° C. and up, under reducing conditions. The temperature is usually raised slowly from 400 up to about 800° C. during the carbonizing process. Preferably, the reducing conditions involve heating in an atmosphere of nitrogen or in the absence of a free-oxygen containing gas.

The following examples are set forth to demonstrate this invention.

Example I

Small spheres of cellulose crystallite aggregates having an average level-off D.P. of about 220 and mechanically attrited and spray dried to produce an average particle size of about 38 microns were prepared by mixing 125 grams of the cellulose aggregates and 205 ml. of water in a planetary mixer. The blades of the mixer were set at 2.5 mm. from the side and bottom of the mixing bowl and then rotated at a speed of about 60 r.p.m. for five minutes. The speed of the mixer was then changed to 120 r.p.m. and a heat lamp directed at the side of the mixing bowl. After an hour and twenty five minutes the spheres were formed and the mixer turned off.

The spheres, having a size of about 1.5 mm. in diameter were removed from the mixing bowl and placed under a heat lamp to dry. When dry the spheres had a diameter of about 1.0 mm.

After drying, a sample of the spheres was placed in a glass tube from which the air was removed and the ends sealed. The sample was carbonized by heating in an electric furnace. To minimize fusion of the spheres on heating, the sample was placed in the furnace at room temperature and the temperature of the furnace slowly increased over two hours to 575° C. and then rapidly increased to 700° C. for 15 minutes. The product carbon spheres had decreased to about ⅓ of their original size and were about 19 percent of their original weight.

Example II 250 ml. of a 30% solids suspension of finely-divided carbon having an average particle size of about 20 microns was added to 125 grams of cellulose crystallite aggregates as described in Example I in the bowl of a planetary mixer. About 24 cc. of water was added to bring the mixture to the proper consistency. The mixer was started with the beaters rotating at about 60 r.p.m. for 10 minutes and then the speed was increased to about 120 r.p.m. for 50 minutes. A heat lamp was directed on the side of the bowl during mixing. The product spheres were noncohering and had shrunken to about ⅔ of their wet diameter.

The spheres were carbonized as in Example I to produce pure carbon particles although in this case very little additional shrinkage occurred.

Example III

A mixture containing 180.8 grams of ferric nitrate dissolved in 205 ml. of water and 125 grams of cellulose crystallite aggregates as described in Example I was mixed for a few minutes at 60 r.p.m. in a planetary mixer. The mix became very plastic and required 55 additional grams of cellulose crystallite aggregates to dry it to the stage where it would separate into granules. It was mixed another 120 minutes. Since spheres had not formed it was decided to extrude the mix. 300 ml. of water was added with mixing to obtain an extrudable mass. The mix was then slowly extruded through a ³⁄₁₆ inch circular die using a hand pressure gun to obtain smooth uniform cylinders which dried in air to an orange-brown solid about ⅔ of the original diameter.

The cylinders were heated to carbonizing temperatures up to 1200° C. in nitrogen during which time they shrunk to about ⅔ their original diameter and turned black. The cylinders were magnetic.

Example IV 125 grams of black, magnetic iron oxide powder, 125 grams of cellulose crystallite aggregates as described in Example I and 255 ml. of water were mixed together for 1½ hours at 60 r.p.m. in a planetary mixer to obtain small, black spheres. After drying the spheres were carbonized as in Example III, during which time they showed little shrinkage. The carbonized spheres were magnetic.

Example V 102.42 grams of hydrated nickel acetate was dissolved in 205 ml. of water and about 10 ml. of concentrated nitric acid. This was then mixed with 175 grams of cellulose crystallite aggregates as described in Example I in a planetary mixer. The mixing speed was set at 60 r.p.m. and continued for 2½ hours to produce well formed microspheres.

On drying the tiny spheres were heated in nitrogen up to 1000° C. during which time they shrank and turned black. The tiny black spheres were quite hard and magnetic.

Example VI 91.5 grams of hydrated lead acetate, 250 grams of cellulose crystallite aggregates as described in Example I and 410 cc. of water were mixed together for four hours in a planetary mixer at a beater speed of 60 r.p.m. Good small spheres obtained from this process were air dried and then carbonized in nitrogen. During this heating the spheres shrank and turned black. The flakes of lead remained specular up to its melting point.

Example VII

A batch of lead tartarate was prepared by reacting 200 grams of tartaric acid, neutralized to pH 8 with concentrated sodium hydroxide in 1000 ml. of water, with 400 grams of lead acetate. Some aluminum from the stirrer probably contaminated the batch as a gel formed. Acetic acid was added to pH 5 and the gel dissolved. Then, sodium hydroxide was added to pH 7 and the batch filtered and washed with hot water. The wet filter cake was put in the bowl of a planetary mixer and dry cellulose crystallite aggregates as described in Example I were added, with the beaters of the mixer rotating at 60 r.p.m., until spheroidization started. The mixer was then run at this speed for 1½ hours to complete the formation of spheres. The product spheres were dried and a small sample heated in a closed tube in the absence of air and the tube sealed after decomposition was complete. After cooling the tube was broken open and the product ignited spontaneously on exposure to air. The pyrophoric lead, therefore, was not deactivated by the carbonization of the cellulose crystallite aggregates.

Example VIII 25 grams of metallic copper powder, 125 grams of cellulose crystallite aggregate and 205 ml. of water were mixed at a beater speed of 60 r.p.m. for three hours in a planetary mixer. On drying in air, good small spheres were obtained which shrank on heating to carbonizing temperatures in nitrogen. The flakes of metal in the carbonized spheres remained specular up to their melting point.

Example IX 125 grams of powdered calcium carbonate, 125 grams of cellulose crystallite aggregates as described in Example I and 280 ml. of water were mixed together in a planetary mixed until spheroidization was complete. The spheres were dried and heated to carbonizing temperatures under nitrogen.

Example X 180 grams of active carbon, 20 grams of cellulose crystallite aggregates as described in Example I and 410 ml. of deionized water were mixed together in a planetary mixer at a mixer blade rotation speed of 60 r.p.m. for 2 hours and 15 minutes. Good spheres were formed and dried in air. The spheres were heated in nitrogen by increasing the furnace temperature from 200° C. to 500° C. over a 2½ hour period.

Sorptometer measurements on the carbonized sample showed a 97% retention of active surface area for the carbon spheres.

Example XI

Two separate batches comprising 125 grams of cellulose crystallite aggregates as described in Example I, 125 grams of a colloidal silica suspension containing about 30% solids and 84 ml. of water were mixed together in a planetary mixer with the blade clearance set at 2.0 mm. at a blade rotation speed of 60 r.p.m. for 1½ hours. The mix dried out too fast to obtain spheroidization. Therefore, the two batches were combined, 80 ml. of water added and the combined batch mixed for 1½ hours at 60 r.p.m. to produce satisfactory spheres which, when dried, measured 1.3 mm. in diameter.

The dried spheres were then heated under reducing conditions at carbonizing temperatures and for a sufficient time to provide carbon-silica spheres.

Example XII 125 grams of cellulose crystallite aggregates as described in Example I, 125 grams of phosphate shale and 225 ml. of water were mixed in a planetary mixer at 60 r.p.m. for 1½ hours to obtain small spheres.

The spheres were dried and heated under reducing conditions from 5° up to 360° C. over 30 minutes and then from 360 to 550° C. over 66 minutes to obtain carbon-phosphate shale spheres reduced to about 67% of their original volume.

We claim:
1. A method of preparing a shaped carbon article which consists essentially of mixing substantially dry cellulose crystallite aggregates and a non-solvent liquid therefor to form a paste, subsequently forming a shaped article from the paste, removing the liquid from the article, and heating said article to a carbonizing temperature in the absence of a free-oxygen containing gas.
2. The method of preparing a shaped carbon article of claim 1 wherein the non-solvent liquid is water.

3. A method of preparing a shaped carbon article which consists essentially of mixing from 5 to 95% by weight of substantially dry cellulose crystallite aggregates, from 95 to 5% by weight of another particulate material and a non-solvent liquid for said cellulose crystallite aggregates to form a paste, subsequently forming a shaped article from the paste, removing the liquid from the article, and heating said article to a carbonizing temperature in the absence of a free-oxygen containing gas, said weight percentage based on the weight of the dry solids in the shaped article prior to carbonization.

4. The method of claim 3 wherein the non-solvent liquid is water.

5. The method of claim 3 wherein the other material is finely-divided carbon.

6. The method of claim 3 wherein the other material is finely-divided cellulose fiber.

7. The method of claim 3 wherein the other material is finely-divided asbestos.

8. The method of claim 3 wherein the other material is a glass-forming oxide.

9. The method of claim 3 wherein the other material is a metal containing material.

10. The method of claim 9 wherein the other material is a free metal.

11. The method of claim 9 wherein the other material is a metal compound.

References Cited

UNITED STATES PATENTS

| | | | |
|---|---|---|---|
| 3,001,238 | 9/1961 | Goeddel et al. | 264—29 |
| 3,104,159 | 9/1963 | Davidson | 264—29 |
| 3,238,054 | 3/1966 | Bickerdike et al. | 264—29 |
| 3,250,832 | 5/1966 | Metz | 264—29 |

FOREIGN PATENTS

| | | |
|---|---|---|
| 642,775 | 6/1962 | Canada. |
| 946,246 | 1/1964 | Great Britain. |

ROBERT F. WHITE, *Primary Examiner.*

J. R. HALL, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,400,181                  September 3, 1968

Orlando A. Battista et al.

It is certified that error appears in the above identified patent and that said Letters Patent are hereby corrected as shown below:

Column 4, line 75, "24" should read -- 25 --. Column 6, line 24, "mixed" should read -- mixer --; line 62, "5°" should read -- 65° --.

Signed and sealed this 20th day of January 1970.

(SEAL)
Attest:

Edward M. Fletcher, Jr.
Attesting Officer

WILLIAM E. SCHUYLER, JR.
Commissioner of Patents